Figure 5:
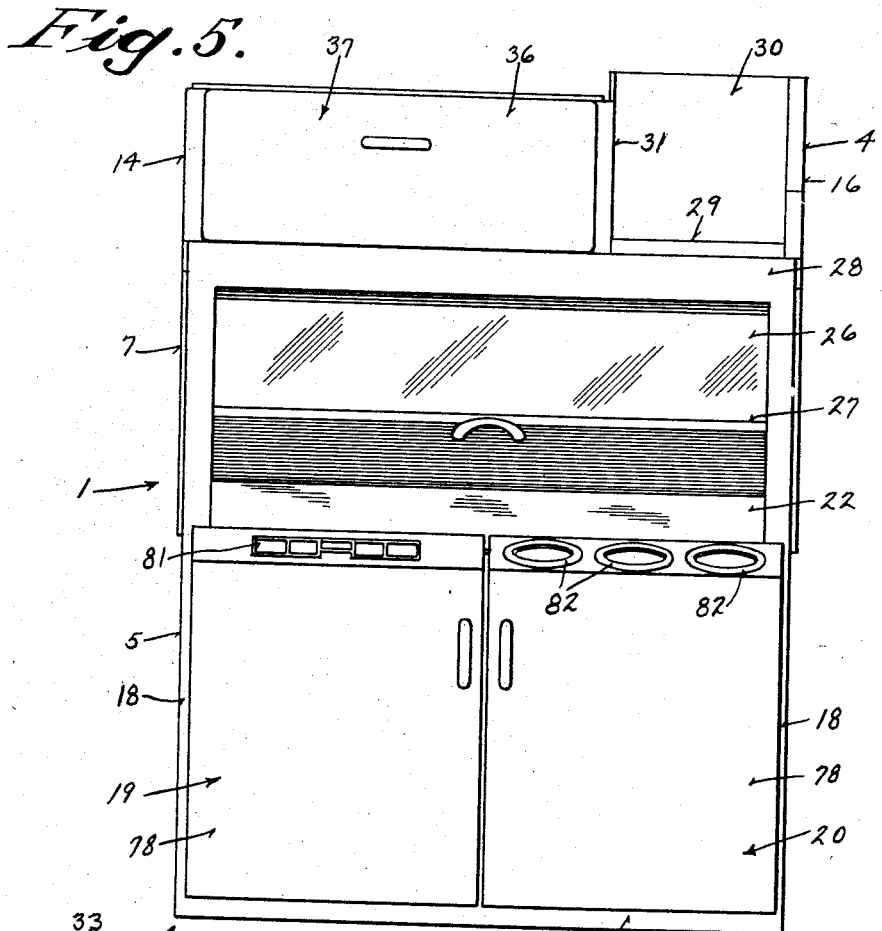

Feb. 24, 1959 H. J. FITZGERALD 2,875,013
POPCORN WARMER AND SERVER
Filed Nov. 28, 1955 3 Sheets-Sheet 1
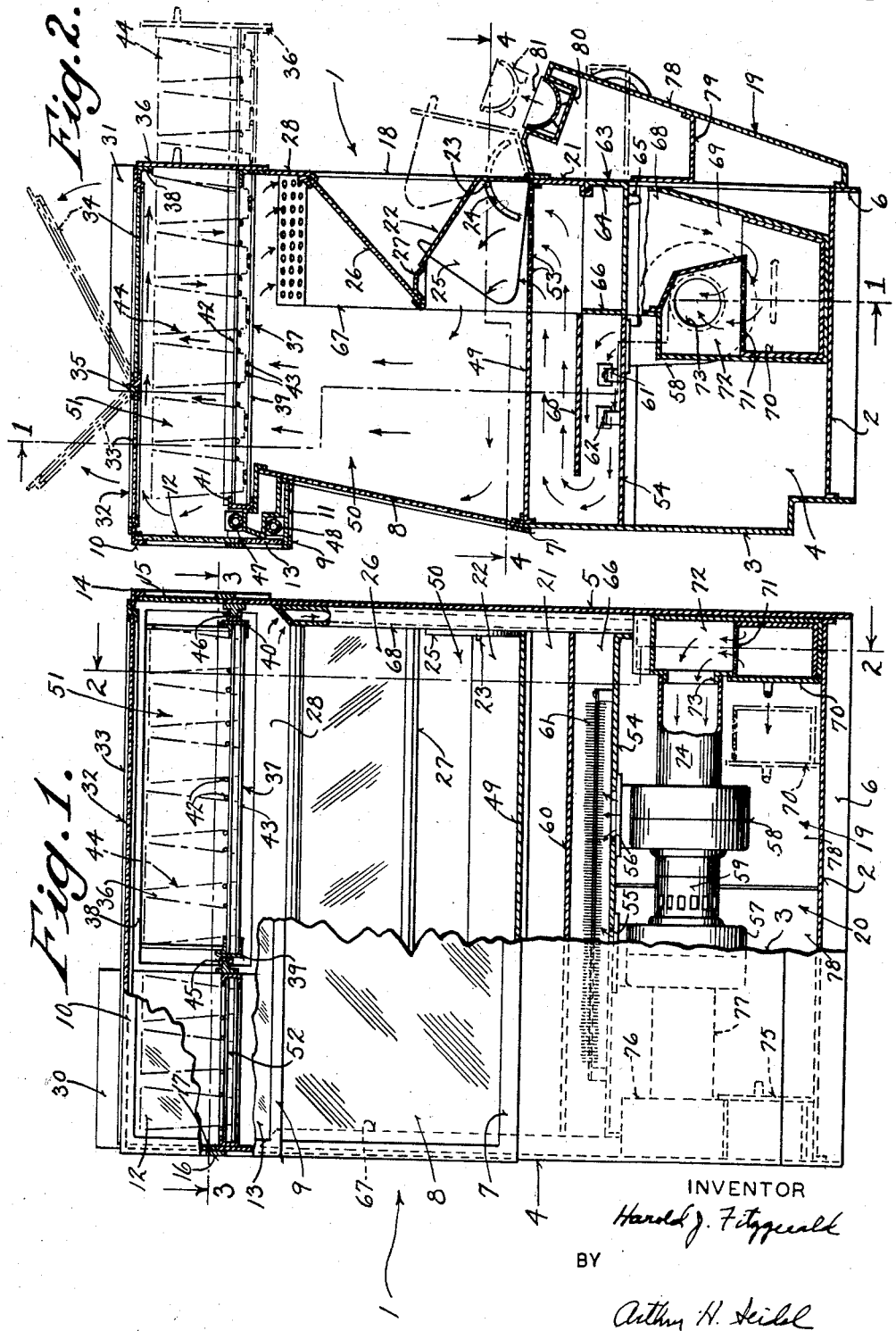
INVENTOR
Harold J. Fitzgerald
BY
Arthur H. Seidel
ATTORNEY Feb. 24, 1959  H. J. FITZGERALD  2,875,013
POPCORN WARMER AND SERVER
Filed Nov. 28, 1955  3 Sheets-Sheet 2
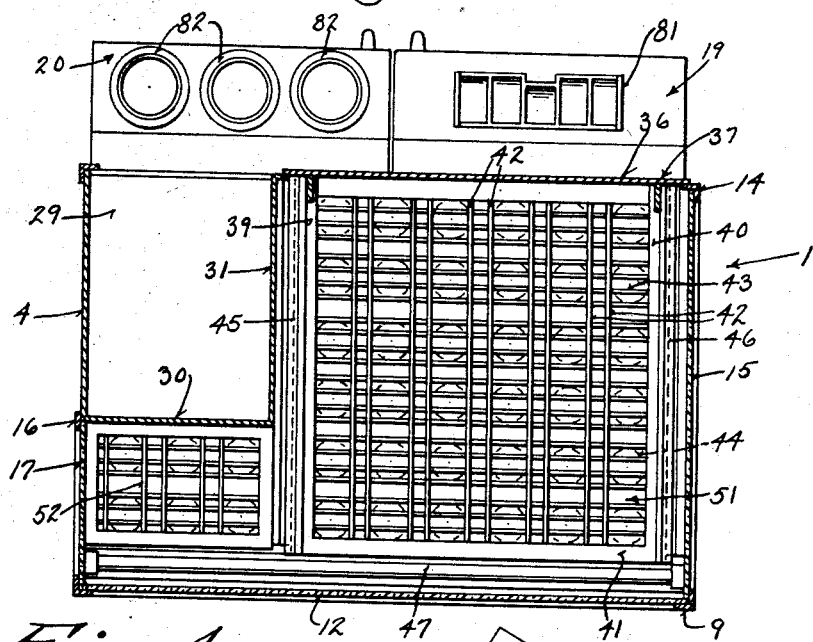
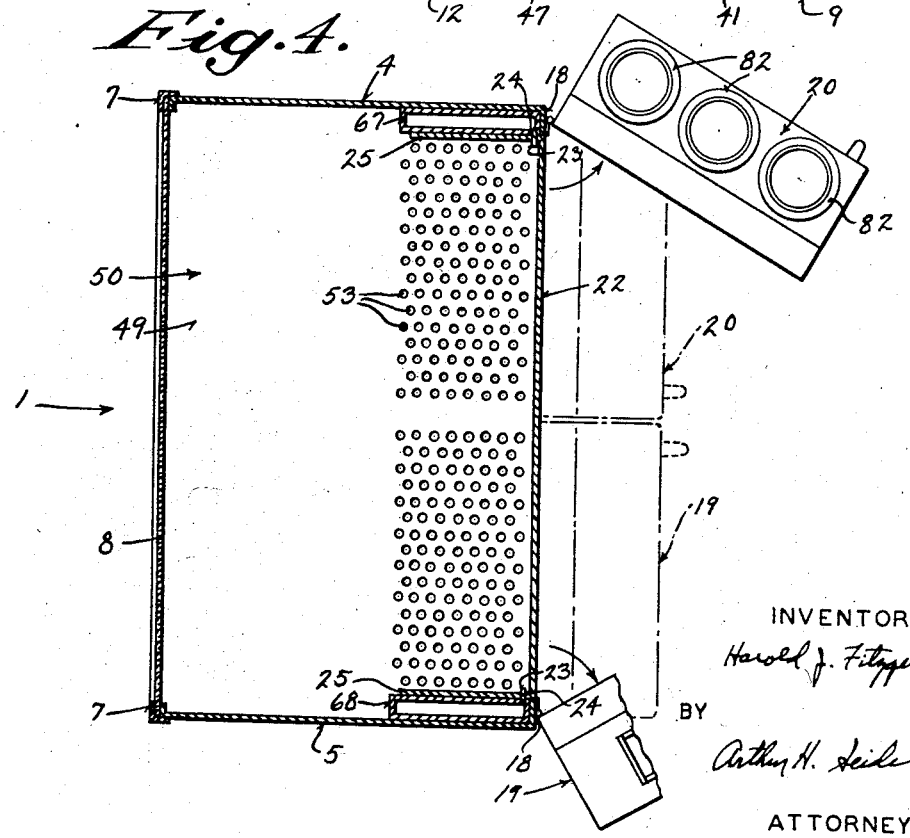
INVENTOR
Harold J. Fitzgerald
BY
Arthur H. Seidel
ATTORNEY Feb. 24, 1959 H. J. FITZGERALD 2,875,013
POPCORN WARMER AND SERVER
Filed Nov. 28, 1955 3 Sheets-Sheet 3

INVENTOR
Harold J. Fitzgerald
BY
Arthur H. Seidel
ATTORNEY

United States Patent Office 2,875,013
Patented Feb. 24, 1959

2,875,013

POPCORN WARMER AND SERVER

Harold J. Fitzgerald, Milwaukee, Wis., assignor to Supurdisplay, Inc., Milwaukee, Wis., a corporation of Wisconsin Application November 28, 1955, Serial No. 549,356

10 Claims. (Cl. 312—236)

This invention relates to popcorn warming apparatus and it more specifically resides in a cabinet for holding popped corn at the point of sale where it is to be dispensed, the cabinet having means for circulating air to retain the corn in a warm, palatable state and there being provided means for removing chaff from the circulated air stream to retain the apparatus clean, there also being provided ready means for introducing corn to the cabinet and for removing the corn as it is needed.

In handling popped corn at concession stands in theaters and the like it is customary practice to pop the corn at a central plant and to transport it to the individual concession stands, where it is placed in dispensing cabinets of size sufficient to hold substantial amounts of corn. Such dispensing cabinets usually have a decorative appearance to enhance the promotion of sales of corn, and since the cabinets are at the point of sale it is further desirable to construct such cabinets in a manner that aids a sales attendant to quickly and efficiently serve customers.

Dispensing cabinets for popped corn should further function to retain the corn in warm, palatable condition. The circulation of heated air in an enclosed cabinet is an end to this purpose. Circulating air, however, causes chaff and flakes of corn and seed to be carried about within the cabinet, with the detrimental result of fouling the apparatus and creating unsightly appearance. In the present invention means are provided for the elimination of such chaff to improve the sightliness of the cabinet and to reduce the maintenance required.

It is an object of this invention to provide a popcorn warmer that has the elements thereof arranged in fashion that facilitates movements of an attendant to enable quick and efficient service of customers.

It is another object of this invention to provide a popcorn warmer that presents a pleasing appearance as an aid to point of sale advertisement.

It is another object of this invention to provide a popcorn warmer in which corn may readily be supplied to the warmer.

It is another object of this invention to provide a popcorn warmer from which popped corn may be removed at a rapid rate in suitable containers to make possible the servicing of large numbers of customers within a limited time period.

It is another object of this invention to provide a popcorn warmer that circulates heated air in which chaff and the like is removed from the air stream to retain the apparatus in a clean state.

It is another object of this invention to provide a popcorn warmer that is fully enclosed, and which has access doors at the rear that require but a minimum of floor space as they are moved to open position.

These and other objects and advantages of this invention will appear from the description to follow. In the description reference is made to the accompanying drawings, which form a part hereof, and in which there is shown by way of illustration and not of limitation a specific embodiment of the invention.

Figure 6:
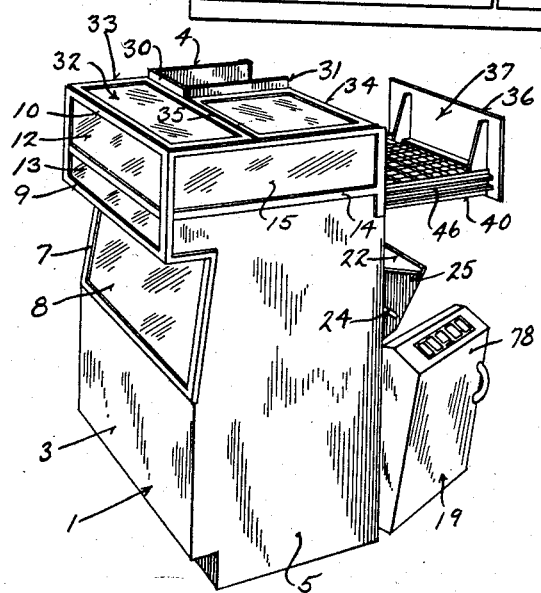

In the drawings:

Fig. 1 is a front view in elevation of apparatus embodying the invention with parts broken away and in section so as to view a portion of the apparatus through the plane 1—1 shown in Fig. 2, Fig. 2 is a side view in elevation of the apparatus viewed through the plane 2—2 shown in Fig. 1, Fig. 3 is a plan view in section of the apparatus taken on the plane 3—3 shown in Fig. 1, Fig. 4 is a plan view in section of the apparatus taken on the plane 4—4 shown in Fig. 2, Fig. 5 is a rear view in elevation of the apparatus, and Fig. 6 is a view in perspective of the apparatus.

Referring now to the drawings, there is shown a dispensing cabinet 1 adapted for the storage of popped corn at the point of sale. The cabinet 1 has a bottom floor 2, shown in Figs. 1 and 2, that is elevated slightly above ground level through attachment with a front wall 3, side walls 4 and 5, and a base strip 6 at the rear of the cabinet 1.

The front wall 3 is fabricated from suitable sheet material, such as metal or wood, and rises upwardly to a level slightly less than half the height of the cabinet 1. The upper edge of the front wall 3 is joined to a frame 7 that has a rearward slope and which mounts a transparent glass panel 8. Extending forwardly from the upper ends of the panel 8 is a horizontal portion of a frame 9, from which the frame 9 turns vertically upward to form a top strip 10 that defines the upper extent of the cabinet 1. A horizontal transparent panel 11 is mounted in the bottom of the frame 9, and both an upper transparent glass panel 12 and an opaque panel 13 are mounted by the vertical extent of the frame 9. The panel 13 may be of glass that carries a legend and a background color to aid the sale of popped corn.

The side wall 5 extends upwardly to a height matching that of the opaque panel 13, and a frame 14 that mounts a transparent panel 15 forms an upward continuation of the wall 5. The side wall 4 rises to the top of the cabinet 1, for a part of the side, and the remainder rises to a height matching that of the opaque panel 13. A frame 16 with a transparent panel 17 completes the side.

As is shown in Fig. 5 a pair of edge strips 18, at the back of the cabinet 1, rise upwardly from the ends of the base strip 6. A pair of hinged doors 19 and 20 span the rear of the cabinet 1 between the strips 18 to a height matching that of the front panel 3. A cross piece 21 extends between the edge strips 18 with its top edge at a level of the top of the doors 19, 20. A pivoted service door 22, that tilts about a horizontal axis along the upper edge of the cross piece 21 provides an entry into the cabinet 1 from which popped corn may be removed. When closed, the door 22 extends forwardly of the edge strips 18 to overhang a portion of the interior of the cabinet 1. To limit the movement of the door 22 a pair of fixed pins 23 project through slots 24 in sides 25 of the door 22.

A downwardly and inwardly sloping transparent panel 26 is disposed over the service door 22, when in closed position, to enclose a portion of the back of the panel 1. The lower edge of the panel 26 is supported by a channel like rib 27, against which the top of the door 22 rests, and the upper edge of the panel 26 is held by an upper cross piece 28 joined to and spanning between the upper ends of the edge strips 18.

On the right hand side of the cabinet 1, as viewed from the rear in Fig. 5, a platform 29 extends forwardly from the cross piece 28 to provide an area upon which a butter dispensing device may be disposed. The underside of the platform 29 forms a partial ceiling for the interior of the cabinet 1, and rising upwardly from the forward edge and the left hand edges, as viewed in Fig. 5, of the platform 29 are walls 30 and 31 respectively. They co-operate with the side wall 4 to enclose the platform 29 on three sides.

A double door assembly 32 encloses the top of the cabinet 1 and comprises a forward door 33 and a rear door 34. Both the doors 33, 34 are hinged about a common axis at 35 and each is formed of a frame mounting a transparent panel. The forward door 33 extends across the full front of the cabinet 1 and is disposed forward of the wall 30, and it opens upwardly as shown in phantom in Fig. 2. The rear door 34 extends between the wall 31 and the top of the frame 14, and also opens as shown in phantom in Fig. 2. Thus, the axis of pivot 35 for the doors 33, 34 extends in alignment with the wall 30. With the doors 33, 34 both closed, as shown in Fig. 6, there is provided a closed ceiling to retain air within the interior of the cabinet 1. The entire door assembly 32 may be lifted from the top of the cabinet 1, or the doors 33, 34 may be opened independently to provide ready access to the interior of the cabinet 1, for the principal purpose of loading the same with popped corn.

A drawer 37 that acts as a tray for holding receptacles filled with corn has a drawer face 36 that extends between the rear edges of the frame 14 and wall 31, and from the upper cross piece 28 upwardly to a horizontal brace 38 upon which the after edge of the door 34 rests. Thus, the drawer 37 completes the enclosure of the cabinet 1. The drawer 37 includes a pair of spaced side rails 39 and 40 that support, together with the drawer face 36 and an end rail 41, an upper grill 42 and a lower grill 43. The lower grill 43 has a plurality of parallel grills extending between the side rails 39, 40 with a spacing to provide a bottom support for a purality of cups 44, such as are shown in phantom in Figures 1 and 2. The upper grill 42 has criss-crossed grills that are spaced to present openings in which may be inserted the cups 44. The spacing of the grills and the configuration of the cups 44 is such that the cups 44 will be spaced for free circulation of air through the drawer 37 and about the cups 44. The grills 42, 43 also permit for feeding ready popped corn through the upper doors 33, 34 into the cabinet interior. When the drawer 37 is empty, but closed, there is little interference to falling corn being transferred into the cabinet 1. To move the drawer 37 between open and closed positions the side rails 39, 40 are supported through the medium of slides 45 and 46.

A cup supporting grill work 52 is disposed to the front of the wall 30 and to the side of the drawer 37. The grill work 52, which is fixed in position, has grills spaced in the same fashion as the upper and lower grills 42, 43 of the drawer 37. Cups 44 may be arranged across the entire front of the cabinet 1, and rearwardly to the back of the apparatus to provide servings ready to dispense at times when substantial numbers of customers are desirous of service.

A pair of lights 47 and 48 of extended length are disposed forward of the drawer 37, and immediately behind the opoque panel 13. The light 47 provides illumination at the top of the cabinet 1 where the cups 44 are placed, and the light 48 directs light through the panel 11 and the sloping front panel 8 to illuminate that portion of the interior of the cabinet 1 having popped corn stored in bulk.

A horizontal platform 49 extends rearwardly from the upper edge of the front wall 3 to the upper edge of the cross piece 21 and extends between the side walls 4 and 5 to divide the cabinet 1. The platform 49 serves the purpose of supporting popped corn stored within the cabinet 1, and it defines the lower extent of a warming container 50 in which such corn is stored. The container 50 extends upwardly to the top of the cabinet 1 and the enlarged compartment in which the drawer 37 is housed forms an upper continuation of the container 50. This upper compartment has been designated by the reference numeral 51, appearing in Figs. 1 and 2.

The portion of the platform 49 directly beneath the service door 22, when closed, and the sloping panel 21 is perforate for the emission of heated air into the warming container 50 and its upper continuation, the compartment 51. Openings 53 in the platform 49, which give rise to the perforate character beneath the door 22, are of dimension small enough to prohibit kernels of popped corn from passing through the same, but are of sufficient size to pass chaff intermixed with the corn. The forward area of the platform 49 is imperforate so that the air emitted into the container 50 enters in the confined area at the rear and beneath the door 22.

Beneath the imperforate portion of the platform 49 is a partial deck 54, which has a pair of openings 55, 56 that pass air upwardly from the discharge mouths of a pair of blowers 57 and 58 disposed immediately beneath the deck 54. The blowers 57, 58 are driven by a motor 59, and to direct the flow of air passing from the openings 55, 56 a horizontal baffle 60 is placed at a level midway between the platform 49 and the partial deck 54. The forward edge of the baffle 60 is set back from the front wall 3 and a pair of air heaters 61, 62 are mounted upon the partial deck 54, whereby the air is directed forwardly across the heaters 61, 62 and then upwardly and around the forward edge of the baffle 60 and hence rearwardly on the under side of the platform 49 toward the openings 53.

A chaff collecting tray 63 is positioned directly behind the partial deck 54 and the baffle 60. The tray 63 has a front panel 64 with a turned upper edge that fits snugly with the lower edge of the cross piece 21, when in closed position as shown in Fig. 2. A handle 65 is fastened on the underside of the tray 63 and a back 65 closes off the opening between the deck 54 and baffle 60 when the tray is in the position of Fig. 2. Thus, with the tray 65 in the position of Fig. 2 the air discharged from the blowers 57, 58 will flow forwardly over the heaters 61, 62, and then about the forward edge of the baffle 60 along the underside of the platform 49. The air stream then passes through the openings 53 into the popcorn warming container 50, as shown by the arrows of Fig. 2.

The top of the chaff tray 63 is open and is directly beneath the perforate portion of the platform 49. Numerous chaff particles intermixed with popped corn are of a size that passes through the perforate openings 53, and if desired the openings 53 may be large enough to readily pass chaff for the purpose of clearing the platform 49 as popped corn is removed through the opening of the service door 22. To this end, the perforate portion of the platform 49 and the tray 63 are disposed to provide for ready removal of chaff.

Air return ducts 67 and 68 are attached to the inner sides of the side walls 4 and 5 respectively to conduct air from the warming container 50 and its upper compartment 51 to the intakes of the blowers 57 and 58. The inlets at the upper ends of the return ducts 67, 68 are disposed at a height above that intended as a maximum level for bulk corn stored within the cabinet 1. This is a height slightly beneath the drawer 37. Each duct 67, 68 extends vertically downward beneath the partial deck 54 and the chaff tray 63 and forms a narrowed discharge neck, such as indicated by the numeral 69 in Fig. 2, in connection with the duct 68. The discharge neck 69 opens upon a chaff tray 70 directly beneath the vertical run of the duct 68. An air filter screen 71 covers a major portion of the top of the tray 70, and the air entering the tray 70 from the discharge neck 69 is turned upwardly through the screen 71. Thus, the abrupt change in direction of the air flow, from a vertical descent, will cause chaff, which exhibits appreciable mass, to leave the air stream and accumulate in the tray 70. Chaff not so removed will be caught upon the screen 71.

The screened portion of the tray 70 is directly beneath a chamber 72 having an outlet 73. A conduit 74 joins the outlet 73 with the intake of the blower 58, thus there is provided an air return passage leading from the top of the air return duct 68 vertically downwardly into the chaff tray 70, and hence upwardly through the screen 71, the chamber 72, and the conduit 74 to the blower 58, to complete a continuous air circulation path for the enclosed interior of the cabinet 1. On the side of the cabinet 1 opposite the duct 68 there is a second chaff tray 75, a chamber 76 and a conduit 77 associated with the duct 68 and the blower 57 that are similar to the like elements described in connection with the duct 68. There is thus provided dual air return paths and blowers for removing air from and returning it to the corn warming container 50.

The chaff trays 70, 75 may be readily removed, as shown in phantom in Fig. 1, for cleaning. Each chaff tray 70, 75, when in position, has a bottom, sides, front and back that form snug fits to prohibit entrance of unwanted air from the exterior of the air conducting elements.

The doors 19 and 20 swing rearwardly about a vertical axis of pivot and each encloses half the back of the apparatus below the service door 22. When open, the doors 19, 20 provide ready access to the chaff trays 63, 70 and 75 and the blowers and motor 57, 58, 59. Each door 19, 20 has a relatively shallow depth at the bottom, as shown in Fig. 2, and has an oblique door front 78 extending upwardly and to the rear, such that the depth of each door increases with height. A storage shelf 79 is incorporated in the interior of the door 19, and a recess 80 is formed at the top of the door 19 to receive a removable coin tray 81, which is readily accessible by an attendant. The door 20 holds a set of three cup dispensers 82 from which cups, such as the cups 44, may be extracted from the top of the door by an attendant.

The apparatus of the invention encloses popped corn and a circulation path for air that is heated and forced through the corn, for the purpose of retaining the corn in a palatable condition. The air stream is directed in such fashion that chaff from the corn is removed thereby increasing cleanliness and removing particles that might otherwise collect and foul the apparatus. The manner of directing air, that has passed over the heaters 61, 62 first beneath the platform supporting the corn and then through the perforate portion of the platform not only provides for improved collection of chaff, but also warms the corn immediately above the platform without passing air directly therethrough. The air passes through the platform in the localized area of the service door, thereby inhibiting the entry of cool air of the exterior upon opening the service door.

I claim:

1. In a popcorn warming apparatus the combination comprising a warming container for holding loose, popped corn that has a floor, a door at one side rising above the level of the floor, and an obliquely disposed baffle extending downwardly and inwardly from the side at which the door is located, the baffle being disposed at a height above that of the door and overhanging an area of the floor, the area of the floor beneath the baffle being perforate and the remainder of the floor being imperforate; blower means having a discharge outlet connected with the perforate area of the floor to force air therethrough; heating means disposed between the blower means and the floor; and an upper compartment forming a continuation of said warming container having a tray with an open grid through which air may circulate from the warming container that is adapted to receive receptacles for corn, said tray being exposable for placement of receptacles in the open grid and also removal therefrom.

2. An apparatus in accordance with claim 1 in which said container includes an air return duct having an opening at a substantial height in the container which is beneath said tray and having a discharge end joined to an intake of said blower; the interior of said container and the air circulation elements comprising the return duct and blower being fully enclosed from the exterior.

3. In a popcorn warming apparatus the combination comprising a warming container for holding popped corn; a blower having an outlet leading to said container for feeding air thereto and also having an intake; an air return duct having an entrance within said container to receive air therefrom and extending downwardly therefrom with a substantially vertical passage for air flowing through the duct terminating at a downwardly facing outlet; a connecting air conduit extending from an inlet end positioned closely adjacent said downwardly facing outlet to provide an abrupt turn for the air flowing from said substantially vertical passage into said connecting air conduit and connected at the other end to the intake of said blower; and a chaff collecting receptacle forming a downward continuation of said substantially vertical passage that is disposed beneath the abrupt turn for air conducted into the conduit.

4. An apparatus in accordance with claim 3 having a removable tray forming a bottom for said chaff collecting receptacle that has a closed position sealing the interior of the receptacle from the exterior, and having a screen over the entrance to said connecting air conduit which is directly above said removable tray.

5. An apparatus in accordance with claim 3 having a perforate floor section for said warming container and an imperforate floor section; an air passage between said blower outlet and the underside of the perforate floor section that extends beneath the imperforate floor section to present a substantially horizontal flow path for air conducted therethrough, from which air flows abruptly upwardly as it passes to beneath and through the perforate floor section; and a chaff collecting chamber beneath said perforate floor section at a level below the horizontal flow path for air.

6. In a popcorn warming apparatus the combination comprising a warming container for holding popped corn that has a floor and a service door at one side rising above the level of the floor, the area of the floor adjacent the door being perforate and the remainder imperforate; a blower having an intake and an outlet; an air passage joined to the blower outlet extending beneath the imperforate floor area and connected with the perforate floor area to discharge air therethrough; air heating means in said air passage to heat air before passing beneath the imperforate floor area; an air return duct having an entrance within said container to receive air therefrom and extending downwardly therefrom with a substantially vertical passage for air flowing through the duct terminating at a downwardly facing outlet; a connecting air conduit extending from an inlet end positioned closely adjacent said downwardly facing outlet to provide an abrupt turn for the air flowing from said substantially vertical passage into said connecting air conduit and connected at the other end to the intake of said blower; and a chaff collecting receptacle forming a downward continuation of said substantially vertical passage that is at a level beneath the juncture with said connecting air conduit.

7. In a popcorn warming apparatus the combination comprising a warming container to hold popped corn having side walls, a floor with a perforate section adjacent one side wall and an imperforate section, a door in the side wall adjacent said perforate section, and a baffle above the perforate section that slopes downwardly and inwardly; blower means having an outlet connected to the perforate section of said floor to feed air to said container and having an intake; air heating means disposed between the blower means and the floor; a return duct having an opening within said container and an exit connected to the intake of said blower; an upper compartment forming a continuation of said warming container having a tray that forms a side wall of the compartment, said tray including an open grid through which air may circulate from the warming container that is adapted to receive receptacles for corn, and said tray being movable from within the upper compartment to a position outside the compartment to thereby expose the open grid; and a cover for said upper compartment above said tray that may be opened for filling the warming container with corn while said tray is within the upper compartment.

8. An apparatus in accordance with claim 7 in which said tray slides on a horizontal track and the tray has a front panel that forms a side of the upper compartment when the tray is in closed position.

9. In a popcorn warming apparatus the combination comprising a warming container for holding popped corn; a base compartment beneath said warming container; blower means disposed within said base compartment having an intake and an outlet leading to said container for feeding air thereto; a return duct having an entrance within said container and extending downwardly into said base compartment with a connection with the intake of said blower means; an upper compartment forming a continuation of said warming container; an open grid tray in said upper compartment through which air may circulate from the warming container and which tray is adapted to receive receptacles for corn; and a cover for said upper compartment to provide access thereto.

10. In a popcorn warming apparatus the combination comprising a warming container to hold popper corn having side walls, a perforate floor, and a door in a side wall; blower means having an outlet connected with the perforate floor to feed air to said container and also having an intake; a return duct having an opening within said container and an exit connected to the intake of said blower; an upper compartment forming a continuation of said warming container having a tray that forms a side wall of the compartment, said tray including an open grid through which air may circulate from the warming container that is adapted to receive receptacles for corn, and said tray being movable from within the upper compartment to a position outside the compartment to thereby expose the open grid; and a cover for said upper compartment above said tray that may be opened for filling the warming container with corn while said tray is within the upper compartment.

References Cited in the file of this patent

UNITED STATES PATENTS

| | | |
|---|---|---|
| 1,452,242 | Jensen | Apr. 17, 1923 |
| 2,458,190 | Newburger | Jan. 4, 1949 |
| 2,626,559 | Rau | Jan. 27, 1953 |